United States Patent
Stefik et al.

(10) Patent No.: US 8,239,397 B2
(45) Date of Patent: **\*Aug. 7, 2012**

(54) SYSTEM AND METHOD FOR MANAGING USER ATTENTION BY DETECTING HOT AND COLD TOPICS IN SOCIAL INDEXES

(75) Inventors: Mark J. Stefik, Portola Valley, CA (US); Sanjay Mittal, Fremont, CA (US); Lance E. Good, Cupertino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 12/360,834

(22) Filed: Jan. 27, 2009

(65) Prior Publication Data

US 2010/0191742 A1 Jul. 29, 2010

(51) Int. Cl.
*G06F 17/30* (2006.01)

(52) U.S. Cl. ......... 707/758; 707/781

(58) Field of Classification Search ......... None
See application file for complete search history.

(56) References Cited

U.S. PATENT DOCUMENTS

| | | | |
|---|---|---|---|
| 5,257,939 A | | 11/1993 | Robinson et al. |
| 5,369,763 A | | 11/1994 | Biles |
| 5,530,852 A | * | 6/1996 | Meske et al. ......... 709/206 |
| 5,671,342 A | * | 9/1997 | Millier et al. ......... 345/418 |
| 5,680,511 A | | 10/1997 | Baker et al. |
| 5,724,567 A | | 3/1998 | Rose et al. |
| 5,784,608 A | * | 7/1998 | Meske et al. ......... 1/1 |
| 5,907,677 A | * | 5/1999 | Glenn et al. ......... 709/206 |
| 5,907,836 A | * | 5/1999 | Sumita et al. ......... 707/754 |
| 5,953,732 A | * | 9/1999 | Meske et al. ......... 715/239 |
| 6,021,403 A | * | 2/2000 | Horvitz et al. ......... 706/45 |
| 6,052,657 A | * | 4/2000 | Yamron et al. ......... 704/9 |
| 6,064,952 A | * | 5/2000 | Imanaka et al. ......... 704/9 |
| 6,233,570 B1 | * | 5/2001 | Horvitz et al. ......... 706/11 |
| 6,233,575 B1 | | 5/2001 | Agrawal et al. |

(Continued)

FOREIGN PATENT DOCUMENTS

EP 1571579 9/2005

(Continued)

OTHER PUBLICATIONS

C. Holahan, "So Many Ads, So Few Clicks," BusinessWeek, p. 38 (Nov. 12, 2007).

(Continued)

*Primary Examiner* — Farhan Syed
(74) *Attorney, Agent, or Firm* — Patrick J. S. Inouye

(57) ABSTRACT

A system and method for managing user attention by detecting hot topics in social indexes is provided. Articles of digital information and at least one social index are maintained. The social index includes topics that each relate to one or more of the articles. Topic models matched to the digital information are retrieved for each topic. The articles are classified under the topics using the topic models. Each of the topics in the social index is evaluated for hotness. A plurality of time periods projected from the present is defined. Counts of the articles appearing under each time period are evaluated. The topics exhibiting a rising curve in the count of the articles that increases with recency during the time periods are chosen. Quality of the articles within the topics chosen is analyzed. The topics including the articles having acceptable quality are presented.

14 Claims, 13 Drawing Sheets

U.S. PATENT DOCUMENTS

| | | | |
|---|---|---|---|
| 6,240,378 B1* | 5/2001 | Imanaka et al. | 704/9 |
| 6,247,002 B1 | 6/2001 | Steels | |
| 6,269,361 B1 | 7/2001 | Davis et al. | |
| 6,285,987 B1 | 9/2001 | Roth et al. | |
| 6,292,830 B1 | 9/2001 | Taylor et al. | |
| 6,397,211 B1 | 5/2002 | Cooper | |
| 6,598,045 B2* | 7/2003 | Light et al. | 1/1 |
| 6,772,120 B1 | 8/2004 | Moreno et al. | |
| 6,804,688 B2 | 10/2004 | Kobayashi et al. | |
| 6,981,040 B1 | 12/2005 | Konig et al. | |
| 7,062,485 B1* | 6/2006 | Jin et al. | 1/1 |
| 7,092,888 B1 | 8/2006 | McCarthy et al. | |
| 7,200,606 B2 | 4/2007 | Elkan | |
| 7,275,061 B1 | 9/2007 | Kon et al. | |
| 7,281,022 B2* | 10/2007 | Gruhl et al. | 1/1 |
| 7,293,019 B2 | 11/2007 | Dumais et al. | |
| 7,320,000 B2 | 1/2008 | Chitrapura et al. | |
| 7,426,557 B2* | 9/2008 | Gruhl et al. | 709/223 |
| 7,467,202 B2 | 12/2008 | Savchuk | |
| 7,496,567 B1 | 2/2009 | Steichen | |
| 7,548,917 B2 | 6/2009 | Nelson | |
| 7,567,959 B2 | 7/2009 | Patterson | |
| 7,600,017 B2* | 10/2009 | Holtzman et al. | 709/224 |
| 7,685,224 B2 | 3/2010 | Nye | |
| 7,707,206 B2 | 4/2010 | Encina et al. | |
| 7,747,593 B2 | 6/2010 | Patterson et al. | |
| 7,809,723 B2 | 10/2010 | Liu et al. | |
| 7,890,485 B2 | 2/2011 | Malandain et al. | |
| 2002/0161838 A1 | 10/2002 | Pickover et al. | |
| 2004/0059708 A1 | 3/2004 | Dean et al. | |
| 2005/0097436 A1 | 5/2005 | Kawatani | |
| 2005/0226511 A1* | 10/2005 | Short | 382/225 |
| 2005/0256905 A1* | 11/2005 | Gruhl et al. | 707/104.1 |
| 2005/0256949 A1* | 11/2005 | Gruhl et al. | 709/223 |
| 2005/0278293 A1 | 12/2005 | Imaichi et al. | |
| 2006/0167930 A1 | 7/2006 | Witwer et al. | |
| 2007/0050356 A1* | 3/2007 | Amadio | 707/5 |
| 2007/0156622 A1 | 7/2007 | Akkiraju et al. | |
| 2007/0214097 A1* | 9/2007 | Parsons et al. | 706/12 |
| 2007/0239530 A1 | 10/2007 | Datar et al. | |
| 2007/0244690 A1 | 10/2007 | Peters | |
| 2007/0260508 A1 | 11/2007 | Barry et al. | |
| 2007/0260564 A1 | 11/2007 | Peters et al. | |
| 2007/0271086 A1 | 11/2007 | Peters et al. | |
| 2008/0040221 A1 | 2/2008 | Wiseman et al. | |
| 2008/0065600 A1 | 3/2008 | Batteram et al. | |
| 2008/0126319 A1 | 5/2008 | Bukai et al. | |
| 2008/0133482 A1 | 6/2008 | Anick et al. | |
| 2008/0140616 A1* | 6/2008 | Encina et al. | 707/3 |
| 2008/0201130 A1 | 8/2008 | Peters et al. | |
| 2008/0307326 A1* | 12/2008 | Gruhl et al. | 715/753 |
| 2009/0099839 A1* | 4/2009 | Stefik | 704/9 |
| 2009/0099996 A1* | 4/2009 | Stefik | 706/54 |
| 2010/0042589 A1* | 2/2010 | Smyros et al. | 707/3 |
| 2010/0057577 A1* | 3/2010 | Stefik et al. | 705/14.73 |
| 2010/0058195 A1* | 3/2010 | Stefik et al. | 715/744 |
| 2010/0070485 A1 | 3/2010 | Parsons et al. | |
| 2010/0083131 A1 | 4/2010 | You | |
| 2010/0114561 A1 | 5/2010 | Yasin | |
| 2010/0125540 A1* | 5/2010 | Stefik et al. | 706/12 |
| 2010/0191741 A1* | 7/2010 | Stefik et al. | 707/748 |
| 2010/0191742 A1* | 7/2010 | Stefik et al. | 707/748 |
| 2010/0191773 A1* | 7/2010 | Stefik et al. | 707/797 |
| 2010/0278428 A1 | 11/2010 | Terao | |

FOREIGN PATENT DOCUMENTS

| | | |
|---|---|---|
| WO | 2005073881 | 8/2005 |
| WO | 2007047903 | 4/2007 |

OTHER PUBLICATIONS

Rocha L. M., "Adaptive Webs for Heterarchies With Diverse Communities of Users," Workshop From Intelligent Networks to the Global Brain: Evolutionary Technology, pp. 1-35 (Jul. 3, 2001).

Arasu et al., "Searching the Web," ACM, New York, NY, US, pp. 2-43 (Aug. 1, 2001).

Imai et al., "Improved Topic Discrimination of Broadcast News Using a Model of Multiple Simultaneous Topics," 1997 IEEE International Conference on Acoustics, Speech, and Signal Processing (ICASSP'97), Apr. 1997, pp. 727-730, vol. 2.

Anonymous "TF-IDF," Wikipedia, the free encyclopedia (Jul. 23, 2007).

Akiko Aizawa, "An Information-Theoretic Perspective of TF-IDF Measures," Information Processing and Management, Elsevier Science Ltd. , vol. 39, No. 1, pp. 45-65 (Jan. 1, 2003).

C. Anderson, "The Long Tail: Why the Future of Business is Selling Less of More," 2006, Chapter 1, pp. 1-26, Hyperion Press, New York.

Schutze H., "The Hypertext Concordance: A Better Back-of-the-Book Index," 1998, Proceedings of Workshop on Computational Technology, pp. 101-104, Montreal, Canada.

Arampatzis et al., "An Evaluation of Linguistically-Motivated Indexing Schemes," 2000, Proceedings of the BCSIRSG.

Biebricher et al., "The Automatic Indexing System AIR/PHYS—1997, From Research to Application," In Readings in Information Retrieval, Morgan Kaufmann Publishers, San Francisco.

G. Sacco, "Dynamic Taxonomies and Guided Searches," Journal of the American Society for Information Science and Technology, vol. 57, Issue 6, Apr. 2006.

Brin et al., "The Anatomy of a Large-Scale Hypertextual Web Search Engine," Paper presented at the Seventh International Conference on World Wide Web. Apr. 14-18, 1998, Brisbane, Australia.

Card et al., "Readings in Information Visualization: Using Vision to Think," 1999, Section 3 Interaction, pp. 231-259, 295-306, Morgan Kaufmann Publishers, San Francisco.

Chi et al., "EBooks With Indexes that Reorganize Conceptually," Paper presented at Human Factors in Computing Systems Conference Apr. 24-29, 2004, Vienna, Austria.

G. W. Furnas, "Generalized Fisheye Views," Paper presented at the Conference on Human Factors in Computing Systems, 1986, Boston, Massachusetts.

Kusek et al., "The Future of Music: Manifesto for the Digital Music Revolution," Boston: Berklee Press, 2005.

P. Pirolli, "Information Foraging Theory: Adaptive Interaction with Information," Oxford: Oxford University Press, 2007.

H. Simon, "Designing Organizations for an Information-Rich World." In Communications and the Public Interest, ed. Martin Greenberger. 37-72. The Johns Hopkins Press, 1971.

R. D. Burt, "Structural Holes and Good Ideas," American Journal of Sociology, vol. 110, No. 2, pp. 349-399, 2003.

C. Mezei, "The Digg Algorithm-Unofficial FAQ," SeoPedia, www.secopedia.org/tips-tricks/social-media/the-digg-algorithm-unofficial-faq, Nov. 2, 2006.

N. Patel, "There's More to Digg Than Meets the Eye," Pronet Advertising, www.pronetadvertising.com/articles/theres-more-to-digg-than-meets-the-eye.html, Jan. 15, 2007.

J. Dowdell et al., "Digg's Kevin Rose on Recent Indiggnation: Fact vs. Fiction," Marketing Shift, www.marketingshift.com/200619/diggs-kevin-rose-recent-indiggnation.cfm, Sep. 7, 2006.

G. A. Miller, "The Magical Number Seven, Plus or Minus Two: Some Limits on Our Capacuty for Processing Information," Psychological Review, vol. 63, pp. 81-97, 1956.

J. Dowdell, "Digg Algorithm for Scoring Stories," Marketing Shift, www.marketingshift.com/2006/9/diggs-algorithm-elements-confirmed.cfm, Sep. 8, 2006.

P. Lenssen, "How Google News Indexes". See http://blogoscoped.com/archive/2006-07-28-n49.html.

A. Agarval, "How Google News works". http://labnol.blogspot.com/2005/05/how-google-news-works.html.

M. Helft, "How a Series of Mistakes Hurt Shares of United". New York Times. http://www.nytimes.com/2008/09/15/technology/15google.html?_r=1.

Yu et al, "PEBL: Positive Example Based Learning for Web Page Classification Using SVM," Proc. of ACM SIGKDD International Conference on Knowledge Discovery and Data Mining (2002).

Nakashima et al., "Information Filtering for the Newspaper," 1997 IEEE Pacific RIM Conference NCE on Victoria, BC, Canada (Aug. 20-22, 1997), vol. 1, pp. 142-145.

Yuan Xue et al., "An Effective News Recommendation in Social Media Based on Users' Preference," 2008 International Workshop on Education Technology and Training and 2008 International Workshop on Geoscience and Remote Sensing, IEEE, Piscataway, NJ, USA, pp. 627-631 (Dec. 21, 2008).

Bracewell et al., "Reading: A Self Sufficient Internet News System with Applications in Information and Knowledge Mining," Natural Language Processing and Knowledge Engineering, International Conference, IEEE, PI, pp. 190-196 (Aug. 1, 2007).

K. Lerman, "Social Information Processing in News Aggregation," IEEE Computer Society, vol. 11, No. 6, pp. 16-28 (Nov. 1, 2007).

G. Linden, "People Who Read This Article Also Read . . . " IEEE Spectrum, vol. 45, No. 3, pp. 46-60 (Mar. 1, 2008).

* cited by examiner

FIG. 9

Vanilla Monitor - vanilla001 : 8684

File  Edit

Overview | Hadoop | Trainer | Modeler | Searcher | Ranker | Hot Topics | Tuner | Cleaner Hot Topics - World News (27) / default (26) / World News (818)

Community: World News ▼    Index: default ▼

Topic Browser
- World News (818)
  - Africa (822)
  - Americas (819)
  - Asia (820)
  - Australia (823)
  - Europe (821)
  - Middle East (844)

HOT Topics:  (existing) Community
COLD Topics: (existing) Community    (emerging) Community    ALL Communities    Hot Period: ○ all  ○ Y  ○ M  ○ W  ⦿ D Global Hot Topics

| Score | Topic | Parent | Community | Day # | Wk Avg | Mo Avg | Wk %Dif | Mo %Dif | WM %Dif | # Subs | Created | Trn Qual |
|---|---|---|---|---|---|---|---|---|---|---|---|---|
| 219 | Inauguration | Politics | USA | 17 | 8.0 | 2.0 | 52 | 88 | 75 | 4 | Dec 15, 2008 | 6 |
| 219 | Sri Lanka | Asia | World News | 8 | 5.0 | 2.0 | 37 | 75 | 60 | 4 | Sept 26, 2008 | 6 |
| 170 | Banking & Finance | Business News | Business News | 9 | 7.0 | 4.0 | 22 | 55 | 42 | 1 | Sept 26, 2008 | 5 |
| 167 | Afghanistan | Foreign Policy | Obama Presidency 2009... | 11 | 4.0 | 1.0 | 63 | 90 | 75 | 2 | Nov 5, 2008 | 1 |
| 167 | Secretary of Energy | Cabinet | Obama Presidency 2009... | 10 | 5.0 | 1.0 | 50 | 90 | 80 | 2 | Nov 5, 2008 | 1 |

Established DB connection vanilla004.parc.xerox.com 3306

FIG. 11

SYSTEM AND METHOD FOR MANAGING USER ATTENTION BY DETECTING HOT AND COLD TOPICS IN SOCIAL INDEXES

FIELD

This application relates in general to digital information search and sensemaking and, in particular, to a system and method for managing user attention by detecting hot and cold topics in social indexes.

BACKGROUND

The Worldwide Web ("Web") is an open-ended digital information repository into which information is posted, with newer articles continually replacing less recent ones or beginning entirely new subjects of discussion. The information on the Web can, and often does, originate from diverse sources, including authors, editors, collaborators, and outside contributors commenting, for instance, through a Web log, or "Blog." Such diversity suggests a potentially expansive topical index, which, like the underlying information, continuously grows and changes. The diversity also suggests that some of the topics in the index may be more timely, that is, "hot," than others, which have since turned "cold" over an extended time period or have moved to the periphery of a topic.

Social indexing systems provide information and search services that organize evergreen information according to the topical categories of indexes built by their users. Topically organizing an open-ended information source, like the Web, into an evergreen social index can facilitate information discovery and retrieval, such as described in commonly-assigned U.S. patent application Ser. No. 12/190,552, entitled "System and Method for Performing Discovery of Digital Information in a Subject Area," filed Aug. 12, 2008, pending, the disclosure of which is incorporated by reference.

Social indexes organize evergreen information by topic. A user defines topics for the social index and organizes the topics into a hierarchy. The user then interacts with the system to build robust models to classify the articles under the topics in the social index. The topic models can be created through example-based training, such as described in Id., or by default training, such as described in commonly-assigned U.S. Patent Application entitled "System and Method for Providing Default Hierarchical Training for Social indexing," Ser. No. 12/360,825, filed Jan. 27, 2009, pending, the disclosure of which is incorporated by reference. Example-based training results in fine-grained topic models generated as finite-state patterns that appropriately match positive training example articles and do not match negative training example articles, while default training forms topic models in a self-guided fashion based on a hierarchical topic tree using both the individual topic labels and their locations within the tree.

In addition, the system can build coarse-grained topic models based on population sizes of characteristic words, such as described in commonly-assigned U.S. Pat. No. 8,010,545, issued Aug. 30, 2011, the disclosure of which is incorporated by reference. The coarse-grained topic models are used to recognize whether an article is roughly on topic. Articles that match the fine-grained topic models, yet have statistical word usage far from the norm of the positive training example articles are recognized as "noise" articles. The coarse-grained topic models can also suggest "near misses," that is, articles that are similar in word usage to the training examples, but which fail to match any of the preferred fine-grained topic models, such as described in commonly-assigned U.S. Provisional Patent Application, entitled "System and Method for Providing Robust Topic Identification in Social Indexes," Ser. No. 61/115,024, filed Nov. 14, 2008, pending, the disclosure of which is incorporated by reference.

Thus, social indexing systems display articles within a topically-organized subject area according to the fine-grained topics in the social index, which can be selected by a user through a user interface. The topical indexing and search capabilities of these systems help users to quickly access information on topics that they specify. However, these capabilities do not address how best to meet a user's need for recent information. Rather, to find new articles under "hot" topics, users must first know what topics to pick and generally face having to wade through the clutter and distraction of topics that are no longer current.

In news reporting, choosing and highlighting the topics representing recent information has long been performed as a manual task. For instance, in daily newspaper publishing, the importance of headlines and lead articles is crucial to the selling of newspapers and the building of circulation, yet the selection of the headlines and lead articles has historically been through the judgment of senior editors that manually decide what is "hot." As well, this practice has carried over to the online news Web sites published by these traditional newspapers, where the lead articles for online newspapers are still manually selected by human editors.

More recently, social media Web sites have evolved for online sharing and collaborative discussion of information. Social media aggregation Web sites, like Digg® (www.digg.com) and Redditt® (www.redditt.com), depend on individual readers to propose stories of potential interest, which are then linked into the Web site. Other users reading the stories vote for the stories that they like and, using these votes, the most popular stories are identified and featured as lead stories.

In contrast, automated news aggregation Web sites, like Google News™ (news.google.com), aggregate the opinions of expert human editors from selected news sources. Each news source provides an overview page presenting its news based on its own lead story selection process, which may be manual, and contributes stories that are organized by specific news section, such as Entertainment or Business. The stories from the multiple sources are clustered to identify similar stories, which are then presented by clusters in their corresponding sections according to the number of stories and other factors.

Notwithstanding, the approaches used by online news, social media aggregation, and automated news aggregation Web sites presuppose a flat list of sparse topics within which recent information can be displayed, which is unlike the rich and topically dynamic organization of information in social indexing.

SUMMARY

The publication times of articles that have been classified under diverse pre-defined fine-grained topical indexes are evaluated to determine which topics are currently "hot" and which topics have turned "cold." In support of information discovery, news articles are identified as being not only hot, but also as fitting into one or more of the topics. The hot topics and the hot articles within those topics are identified and emphasized, while other topics that have gone cold are elided.

One embodiment provides a system and method for managing user attention by detecting hot topics in social indexes. Articles of digital information and at least one social index are maintained. The social index includes topics that each relate to one or more of the articles. Topic models matched to the digital information are retrieved for each topic. The articles are classified under the topics using the topic models. Each of the topics in the social index is evaluated for hotness. A plurality of time periods projected from the present is defined. Counts of the articles appearing under each time period are evaluated. The topics exhibiting a rising curve in the count of the articles that increases with recency during the time periods are chosen. Quality of the articles within the topics chosen is analyzed. The topics including the articles having acceptable quality are presented.

Still other embodiments of the present invention will become readily apparent to those skilled in the art from the following detailed description, wherein are described embodiments byway of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 9 is a screen shot diagram showing, by way of example, hot topic candidates.

FIG. 11 is a screen shot diagram showing, by way of example, training results.

DETAILED DESCRIPTION

Glossary

Figure 1:
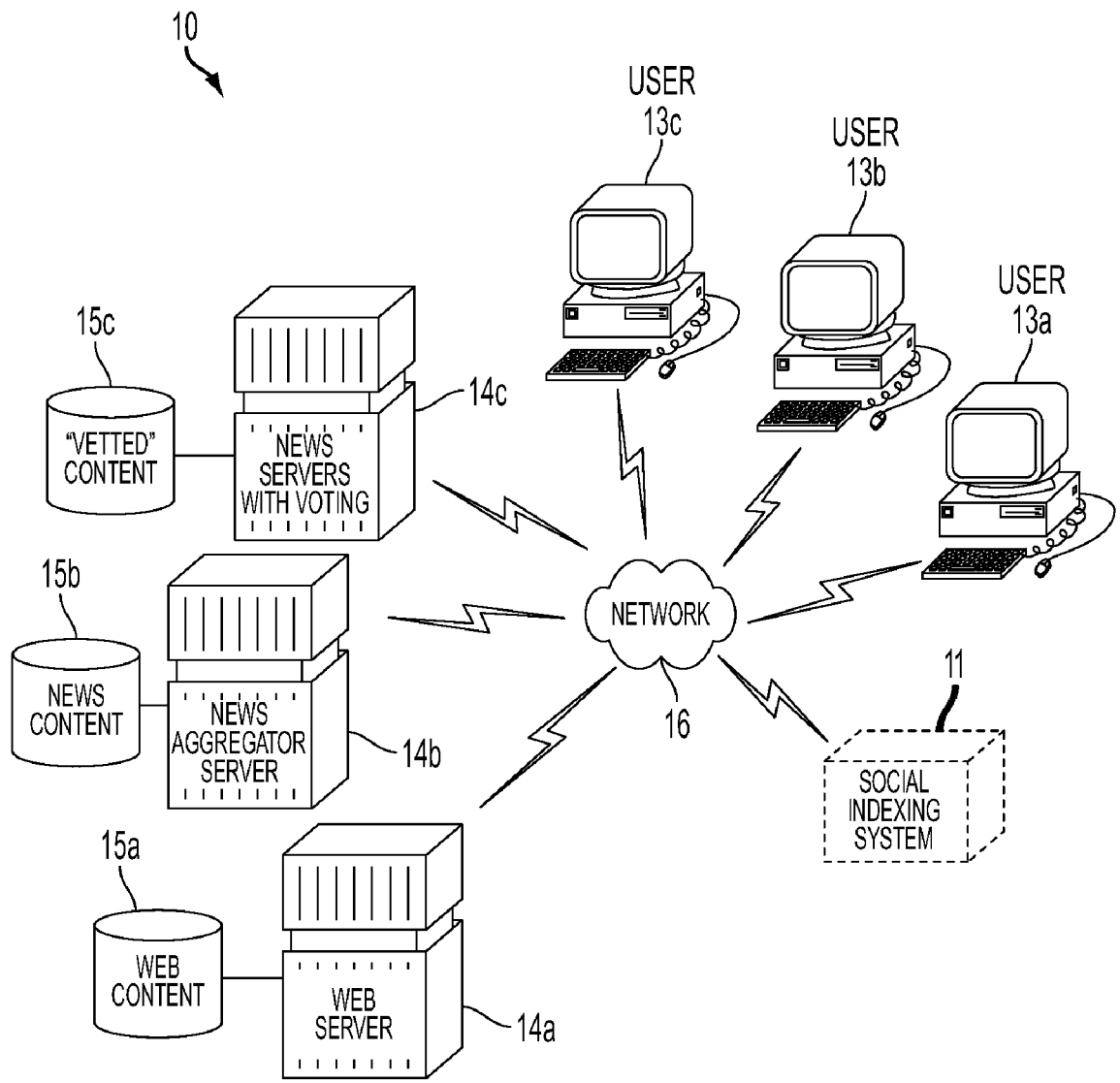
FIG. 1 is a block diagram showing an exemplary environment for digital information.

The following terms are used throughout and, unless indicated otherwise, have the following meanings:

Corpus: A collection or set of articles, documents, Web pages, electronic books, or other digital information available as printed material.

Document: An individual article within a corpus. A document can also include a chapter or section of a book, or other subdivision of a larger work. A document may contain several cited pages on different topics.

Cited Page: A location within a document to which a citation in an index, such as a page number, refers. A cited page can be a single page or a set of pages, for instance, where a subtopic is extended by virtue of a fine-grained topic model for indexing and the set of pages contains all of the pages that match the fine-grained topic model. A cited page can also be smaller than an entire page, such as a paragraph, which can be matched by a fine-grained topic model.

Subject Area: The set of topics and subtopics in a social index, including an evergreen index or its equivalent.

Topic: A single entry within a social index characterizing a topical category. In an evergreen index, a topic has a descriptive label and is accompanied by a fine-grained topic model, such as a pattern, that is used to match documents within a corpus.

Subtopic: A single entry hierarchically listed under a topic within a social index. In an evergreen index, a subtopic is also accompanied by one or more topic models.

Fine-grained topic model: This topic model is based on finite state computing and is used to determine whether an article falls under a particular topic. Each saved fine-grained topic model is a finite-state pattern, similar to a query. This topic model is created by training a finite state machine against positive and negative training examples.

Coarse-grained topic model: This topic model is based on characteristic words and is used in deciding which topics correspond to a query. Each saved coarse-grained topic model is a set of characteristic words, which are important to a topic, and a score indicating the importance of each characteristic word. This topic model is also created from positive training examples, plus a baseline sample of articles on all topics in an index. The baseline sample establishes baseline frequencies for each of the topics and the frequencies of words in the positive training examples are compared with the frequencies in the baseline samples. In addition to use in generating topical sub-indexes, coarse-grained models can be used for advertisement targeting, noisy article detection, near-miss detection, and other purposes.

Community: A group of people sharing main topics of interest in a particular subject area online and whose interactions are intermediated, at least in part, by a computer network. A subject area is broadly defined, such as a hobby, like sailboat racing or organic gardening; a professional interest, like dentistry or internal medicine; or a medical interest, like management of late-onset diabetes.

Augmented Community: A community that has a social index on a subject area. The augmented community participates in reading and voting on documents within the subject area that have been cited by the social index.

Evergreen Index: An evergreen index is a social index that continually remains current with the corpus.

Social Indexing System: An online information exchange infrastructure that facilitates information exchange among augmented communities, provides status indicators, and enables the passing of documents of interest from one augmented community to another. An interconnected set of augmented communities form a social network of communities.

Information Diet: An information diet characterizes the information that a user "consumes," that is, reads across subjects of interest. For example, in his information consuming activities, a user may spend 25% of his time on election news, 15% on local community news, 10% on entertainment topics, 10% on new information on a health topic related to a relative, 20% on new developments in their specific professional interests, 10% on economic developments, and 10% on developments in ecology and new energy sources. Given a system for social indexing, the user may join or monitor a separate augmented community for each of his major interests in his information diet.

Digital Information Environment

A digital information infrastructure includes public data networks, such as the Internet, standalone computer systems, and other open-ended repositories of electronically-stored information. FIG. 1 is a block diagram showing an exemplary environment 10 for digital information, which includes a social indexing system 11 that supports social indexing activities. A digital data communications network 16, such as the Internet, provides an infrastructure for exchange of digital information. Other digital information exchange infrastructures, for instance, a non-public corporate enterprise network, are possible. The network 16 provides interconnectivity to diverse and distributed information sources and consumers that respectively supply and consume the digital information. Authors, editors, collaborators, and outside contributors continually post articles, Web pages, and the like to the network 16, which are maintained as a distributed data corpus though Web servers 14a, news aggregator servers 14b, news servers with voting 14c, and other data repositories that serve as information sources. These sources respectively serve Web content 15a, news content 15b, community-voted or "vetted" content 15c, and other information to users that access the network 16 through user devices 13a-c, such as personal computers, as well as other servers that all function as information consumers. For simplicity, only user devices will be discussed, although servers and other non-user device information consumers may similarly search, retrieve, and use information in the corpus.

In general, each user device 13a-c is a Web-enabled device that executes a Web browser or similar application, which supports interfacing to and information exchange and retrieval with the servers 14a-c. Both the user devices 13a-c and servers 14a-c include components conventionally found in general purpose programmable computing devices, such as a central processing unit, memory, input/output ports, network interfaces, and non-volatile storage, although other components are possible. Moreover, other information sources in lieu of or in addition to the servers 14a-c, and other information consumers, in lieu of or in addition to user devices 13a-c, are possible.

A social indexing system 11 supplies articles topically organized under an evergreen index through social indexing, such as described in commonly-assigned U.S. Patent Application, entitled "System and Method for Performing Discovery of Digital Information in a Subject Area," Ser. No. 12/190,552, filed Aug. 12, 2008, pending, the disclosure of which is incorporated by reference. The social indexing system 11 also determines which topics are currently "hot" and which topics have turned "cold" to meet a user's need for recent information, as further described below beginning with reference to FIG. 3. Finally, the social indexing system 11 groups and displays articles by relevance bands, which are sorted by time and filtered by time regions, such as described in commonly-assigned U.S. Patent Application, entitled "System and Method for Using Banded Topic Relevance and Time for Article Prioritization," Ser. No. 12/360,823, filed Jan. 27, 2009, pending, the disclosure of which is incorporated by reference.

Figure 2:
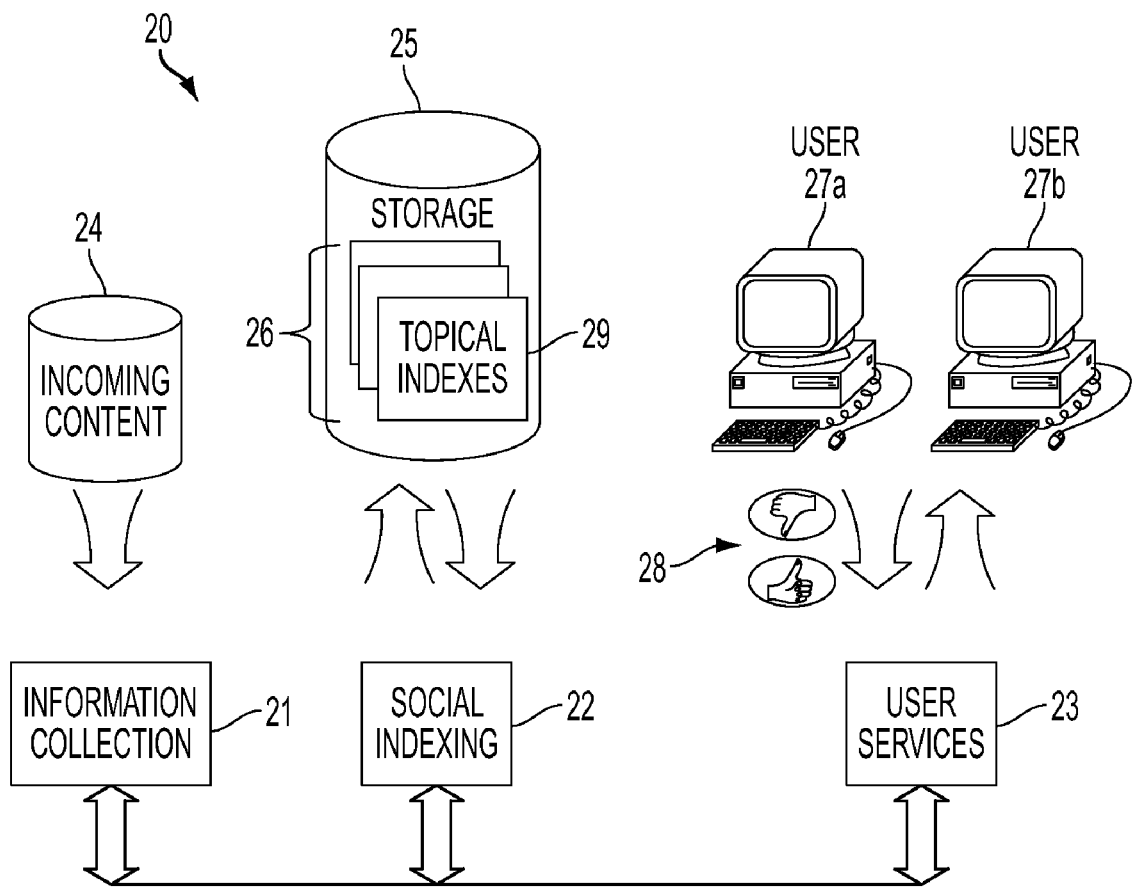
FIG. 2 is a functional block diagram showing principal components used in the environment of FIG. 1.

From a user's point of view, the environment 10 for digital information retrieval appears as a single information portal, but is actually a set of separate but integrated services. FIG. 2 is a functional block diagram showing principal components 20 used in the environment 10 of FIG. 1. Additional components may be required to provide other related digital information activities, such as digital information discovery, prospecting, orienting, and retrieval.

The components 20 can be loosely grouped into three primary functional modules, information collection 21, social indexing 22, and user services 23. Other functional modules are possible. Additionally, the functional modules can be implemented on the same or separate computational platform. Information collection 21 obtains incoming content 24, such as Web content 15a, news content 15b, and "vetted" content 15c, from the open-ended information sources, including Web servers 14a, news aggregator servers 14b, and news servers with voting 14, which collectively form a distributed corpus of electronically-stored information. The incoming content 24 is collected by a media collector to harvest new digital information from the corpus. The incoming content 24 can typically be stored in a structured repository, or indirectly stored by saving hyperlinks or citations to the incoming content in lieu of maintaining actual copies.

The incoming content 24 may be stored in multiple representations, which differ from the representations in which the information was originally stored. Different representations could be used to facilitate displaying titles, presenting article summaries, keeping track of topical classifications, and deriving and using fine-grained topic models. Words in the articles could also be stemmed and saved in tokenized form, minus punctuation, capitalization, and so forth. Moreover, fine-grained topic models created by the social indexing system 11 represent fairly abstract versions of the incoming content 24 where many of the words are discarded and mainly word frequencies are kept.

The incoming content 24 is preferably organized under at least one topical index 29 that is maintained in a storage device 25. The topical index 29 may be part of a larger set of topical indexes 26 that covers all of the information. The topical index 29 can be an evergreen index built through social indexing 22, such as described in commonly-assigned U.S. Patent Application "System and Method for Performing Discovery of Digital Information in a Subject Area," Ser. No. 12/190,552, filed Aug. 12, 2008, pending, the disclosure of which is incorporated by reference. The evergreen index contains fine-grained topic models, such as finite state patterns, that can be used to test whether new information falls under one or more of the topics in the index. Social indexing 22 applies supervised machine learning to bootstrap training material into the fine-grained topic models for each topic and subtopic in the topical index 29. Alternatively, social indexing 22 can perform default training to form topic models in a self-guided fashion based on a hierarchical topic tree using both the individual topic labels and their locations within the tree, such as described in commonly-assigned U.S. Patent Application, entitled "System and Method for Providing Default Hierarchical Training for Social Indexing," Ser. No. 12/360,825, filed Jan. 27, 2009, pending, the disclosure of which is incorporated by reference. Once trained, the evergreen index can be used for index extrapolation to automatically categorize new incoming content 24 into topics for pre-selected subject areas.

User services 23 provide a front-end to users 27a-b to access the set of topical indexes 26 and the incoming content 24, to perform search queries on the set of topical indexes 26 or a single topical index 29, and to access search results, top indexes, and focused sub-indexes. In a still further embodiment, each topical index 29 is tied to a community of users, known as an "augmented" community, which has an ongoing interest in a core subject area. The community "vets" information cited by voting 28 within the topic to which the information has been assigned.

Social Indexing Versus News Delivery

Fundamental differences exist between social indexing and news delivery. These differences include:

Diverse User-defined Perspectives. Social indexes provide multiple, user-defined perspectives on information as reflected in indexes that organize information according to the specialized purposes of interest groups. Diverse perspectives are supported by competing and fluid topical organizational structures. Information may appear in a social index organized in multiple places for different purposes. Users within each interest group can define new organizations at any time. In contrast, online news delivery systems depend upon limited numbers of publishers and editors to select and organize information for a targeted audience. This approach does not scale to the diversity of online users and interest groups.

Pre-defined fine-grained topical organization. Social indexes are intended to cover information organized in potentially millions of subject areas, rather than a few newspaper-style sections, such as World, National, Entertainment, and so on. In addition, within each subject area of a social index, information is further organized into 40-100 fine-grained topics. These fine-grained topics are pre-defined and organized to provide a perspective on the information that is appropriate for a understanding the subject area. The fine-grained organization of information in social indexes applies to all information, including the most recent information. Recent information in a social indexing system is reported together with the fine-grained topical structure appropriate for each subject matter.

Archive Information versus Recent News. Social indexing systems collect information over extended periods of time. Supporting user access to archive information requires temporal analysis that distinguishes different temporal regions and scales, such as very recent news, reasonably current information, and information that is old and possibly out-dated for current purposes. In contrast, online news delivery focuses primarily on recent information.

Hot Topics and Cold Topics

Over time, the topical organization of a social index will typically change. For instance, as information gets complex or overly rich under a particular topic, an index manager may decide to split a topic to provide a finer-grained classification of incoming information. These kinds of changes to topical organization reflect the life cycle of topics. A topic is created when an index is defined or later through topic-splitting and other topic editing operations. Once topic models are trained, new articles are collected regularly and added to the topic in the social index.

Figure 3:
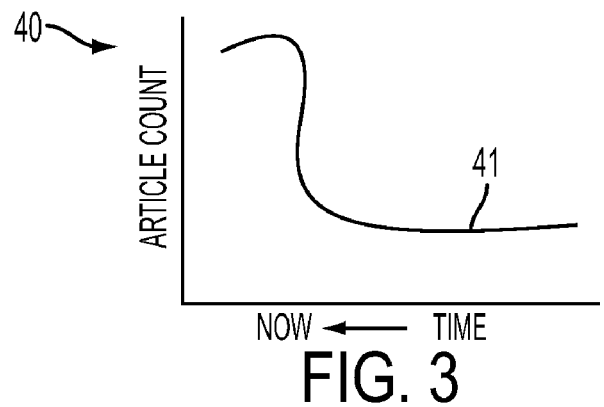
FIGS. 3-5 are graphs respectively showing, by way of example, patterns for hot, cold, and periodic topics.
Figure 4:
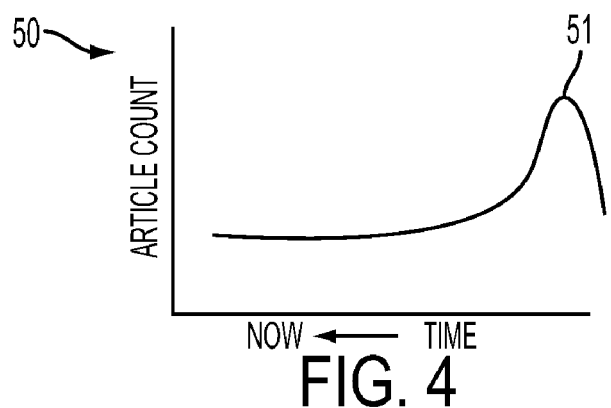
Figure 5:
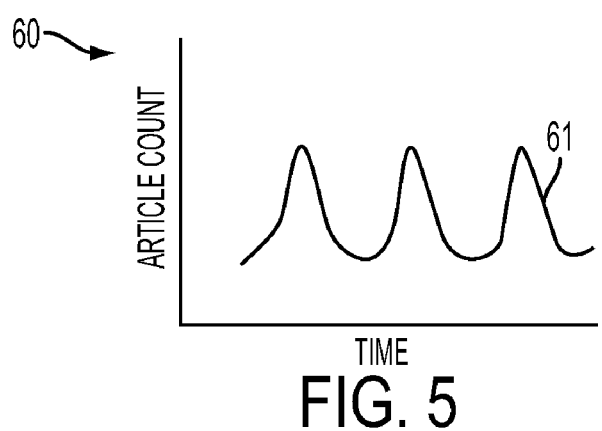

The number of articles appearing under a topic tend to flow in patterns. FIGS. 3-5 are graphs 40, 50, 60 respectively showing, by way of example, patterns for hot, cold, and periodic topics 41, 51, 61. The x-axis represents time moving away from the present and the y-axis represents the number of articles counted over one-day time periods. Referring first to FIG. 3, a topic becomes "hot" when a larger than normal number of articles arrives in a recent time interval. Various extrinsic factors can account for a topic becoming hot. For example, the announcement of a breakthrough or exciting product may trigger a marked increase in the number of articles, thereby making the corresponding topic hot. Similarly, a storm or natural disaster could lead to a flurry of articles. Besides article counts, signals, such as user votes and reputation measures, can be combined to create composite measures of topic hotness. Referring next to FIG. 4, a topic becomes "cold" when just a few on-topic articles have arrived over an extended time period or articles are only appearing on the topic's periphery. Finally, referring to FIG. 5, some topics heat up and cool down periodically. For example, news stories about the Olympic games and other sports events are reported on a periodic calendar basis, as are articles about government elections.

Identifying Hot Topics

Topics in a social index have names and persist over time. On the other hand, interest in particular articles under a topic may come and go. For instance, the topic "school taxes" in a social index would capture articles on a recent school bond measure and might also capture a dispute about property tax rates from six months earlier, or a debate about taxes on gambling revenues being used to fund schools. Different threads of stories can appear over time, yet each thread would be classified under the same topic "school taxes." This type of dynamic story-following is different in nature from just clustering stories appearing in today's news to see whether the stories are about the same event. As topics in a social index persist, the topics give structure to the information in a subject area. Moreover, hot topics encompass more than simply hot stories, but also that the stories fall under a "topic" that is currently hot and thus, that the stories are related, at least in a conceptual sense, to other stories from the past on the same topic.

Figure 6:
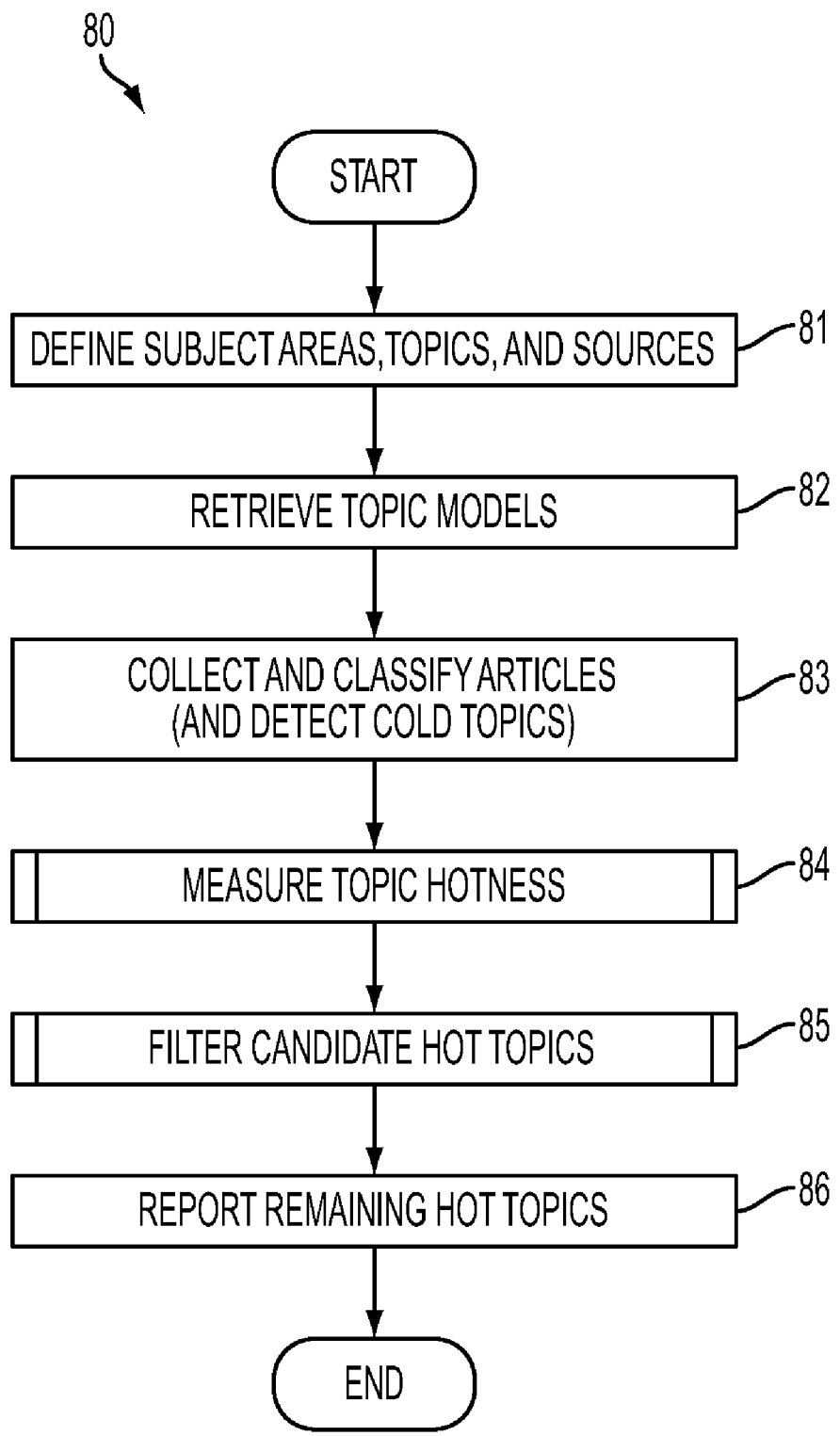
FIG. 6 is a flow diagram showing a method for managing user attention by detecting hot and cold topics in social indexes in accordance with one embodiment.

Succinctly, a topic is "hot" when many more than the usual number of articles on the topic has recently appeared and a topic is "cold" when there are very few recent articles, or only articles on the topic's periphery. FIG. 6 is a flow diagram showing a method 80 for managing user attention by detecting hot and cold topics in social indexes in accordance with one embodiment. The method is performed as a series of process or method steps performed by, for instance, a general purpose programmed computer, such as server.

To create a social index, an index manager specifies a subject area, topics within the subject areas, and sources of information (step 81). The social indexes can be created by a user as a hierarchically-structured topic tree to specify the index topics, or can originate from some other index source. Topic models for each topic are retrieved (step 82). The topic models are used to recognize articles and to classify newly-arriving articles by topic, which renders the social index evergreen. The social index contains fine-grained topic models, such as finite state patterns, that can be used to test whether new information falls under one or more of the topics in the index. The social index can optionally include coarse-grained topic models to recognize whether an article is roughly on topic.

Thereafter, articles are collected and classified into the social index from the information sources (step 83). Each article includes both the article's content and publication date, or other indication of recency. The hotness of the topics into which the articles are collected is measured (step 84), as further described below with reference to FIG. 7. The candidate hot topics are filtered (step 85), as further described below with reference to FIG. 12. Finally, the remaining hot topics are reported (step 86), along with information about their location within the topical organization of the social index. Recent hot articles within the hot topics are reported and the hot articles are clustered as required to remove duplication.

In a further embodiment, the methodology can be applied to one or more social indexes within a social indexing system. The results of hot and cold topic identification can be reported as an aggregate over all of the indexes, or over sets of indexes.

Similarly, entire indexes can be filtered that are not sufficiently popular or which do not enjoy good reputations.

Measuring Topic Hotness

Figure 7:
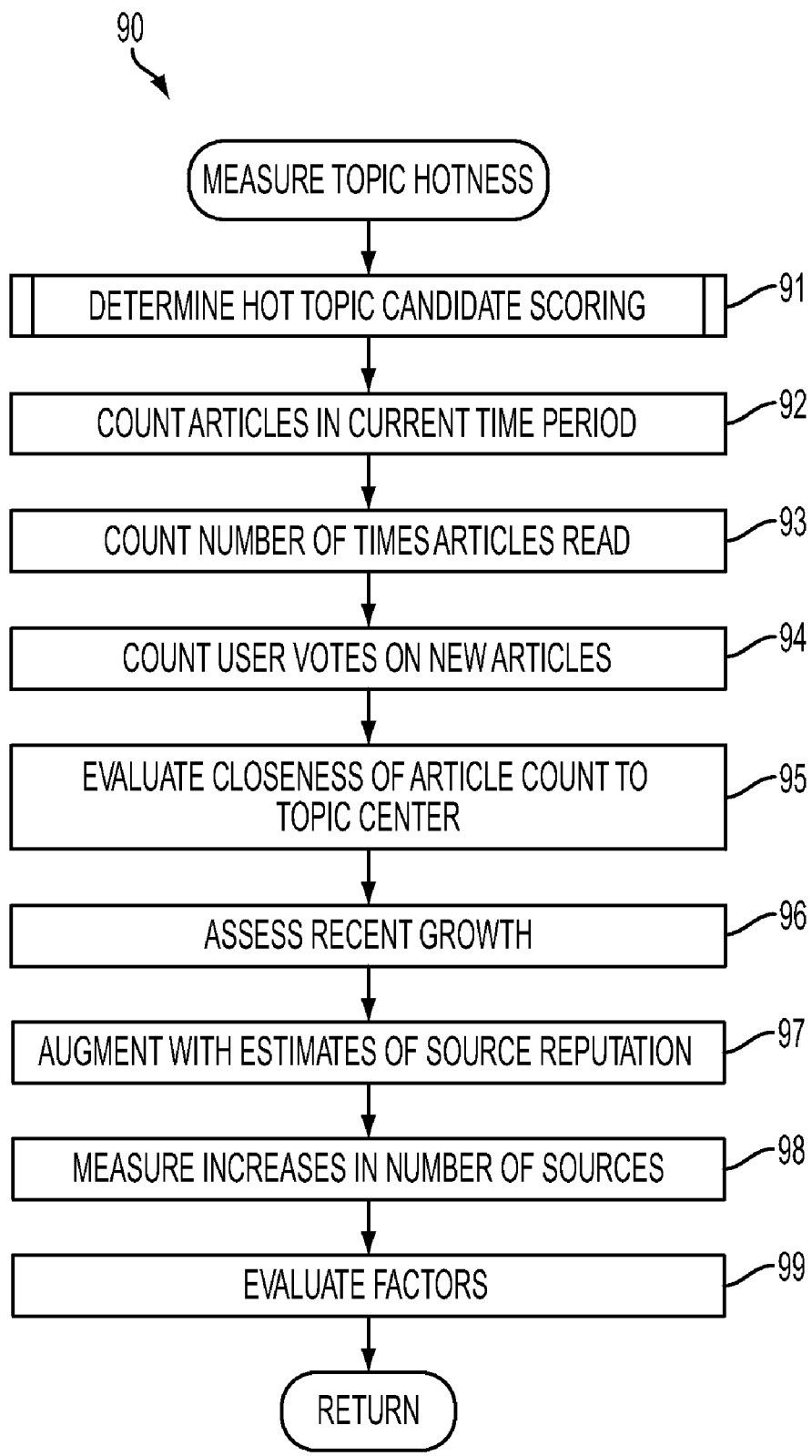
FIG. 7 is a flow diagram showing a routine for measuring topic hotness for use with the method of FIG. 6.

Whether a topic and its articles are "hot" or "cold" depend upon several factors. FIG. 7 is a flow diagram showing a routine 90 for measuring topic hotness for use with the method 80 of FIG. 6. The routine identifies candidate hot topics.

Hot topics are selected based on the evaluation of several factors. First, candidate hot topics are identified and scored (step 91), as further described below with reference to FIG. 8. The number of articles that appear under each topic in a social index in the current time period is determined (step 92), as article counts are a strong indication of "hotness." The current time period can be any predetermined set interval, such as day, week, or month, depending upon the topic and user community's needs for recent information. In one embodiment, the current system is primarily concerned with topics that have become hot over the last day, although other temporal horizons could be selected. In each case, the determination of hotness involves not only a count of the articles on topic in the current period, but also consideration of article counts in previous periods. For example, the average daily count over the previous week and the average daily count over the previous month can be considered. Such consideration distinguishes between topics that typically collect a large number of articles and topics for which there has been a sudden recent growth in the number of articles collected. Notwithstanding, the count of recent articles is most meaningful at the finest level of topic granularity.

In addition, user metrics for the articles counted can be determined. User metrics include, for example, the number of times that an article has been read (step 93) and the number of votes, where available, by users on new articles under a topic (step 94). The user metrics are included in hotness evaluation and those topics having articles with stronger user metrics are preferred.

Raw article counts by themselves cannot distinguish between broad topics that always collect many articles and regular or narrow topics that have a spike with many articles. Another important factor in identifying an existing topic as hot is detecting an influx of articles highly relevant to the topic. Given a metric that measures the closeness of an article to the center of a topic, hotness detection requires that the count of articles close to the center of the topic be sufficiently high (step 95). In contrast, an influx of articles on the fringes of a topic does not make a topic hot. For example, topic score is a linear metric that can act as a closeness-to-center-of-topic metric, which registers one hundred points for articles at the center of a topic and approaches zero for articles at the fringes of the topic. Topic score can be computed using characteristic words, such as described in commonly-assigned U.S. Pat. No. 8,010,545, issued Aug. 30, 2011, the disclosure of which is incorporated by reference. As an aside, an influx of articles on the fringes of a topic may help signal an emerging hot topic, as opposed to an existing hot topic.

As appropriate, several time periods may be assessed to determine whether a high number of articles for a topic in the recent period signifies a significant rise over typical earlier periods (step 96). Additionally, sole reliance on article counts can invite excessive gaming to, for instance, set up social indexes with bogus information sources and nonsense topics, which are then flooded with articles to attract attention as "hot" topics. Thus, due to the wide-ranging nature of online information sources, articles often reflect different qualities and may originate from sources with dissimilar reputations (step 97), which must be evaluated along with any increase in the number of sources providing articles (step 98). The various factors, including hot topic candidate score and training results score, are evaluated (step 99), such as whether an information source is used by multiple user communities, that the community for a social index has sufficient members to warrant legitimate authoritative weight, that people are actually reading the articles appearing in a social index, that the community is referenced by other user communities, that the topics are well-trained, and so on.

Hot Topic Candidate Scoring

Figure 8:
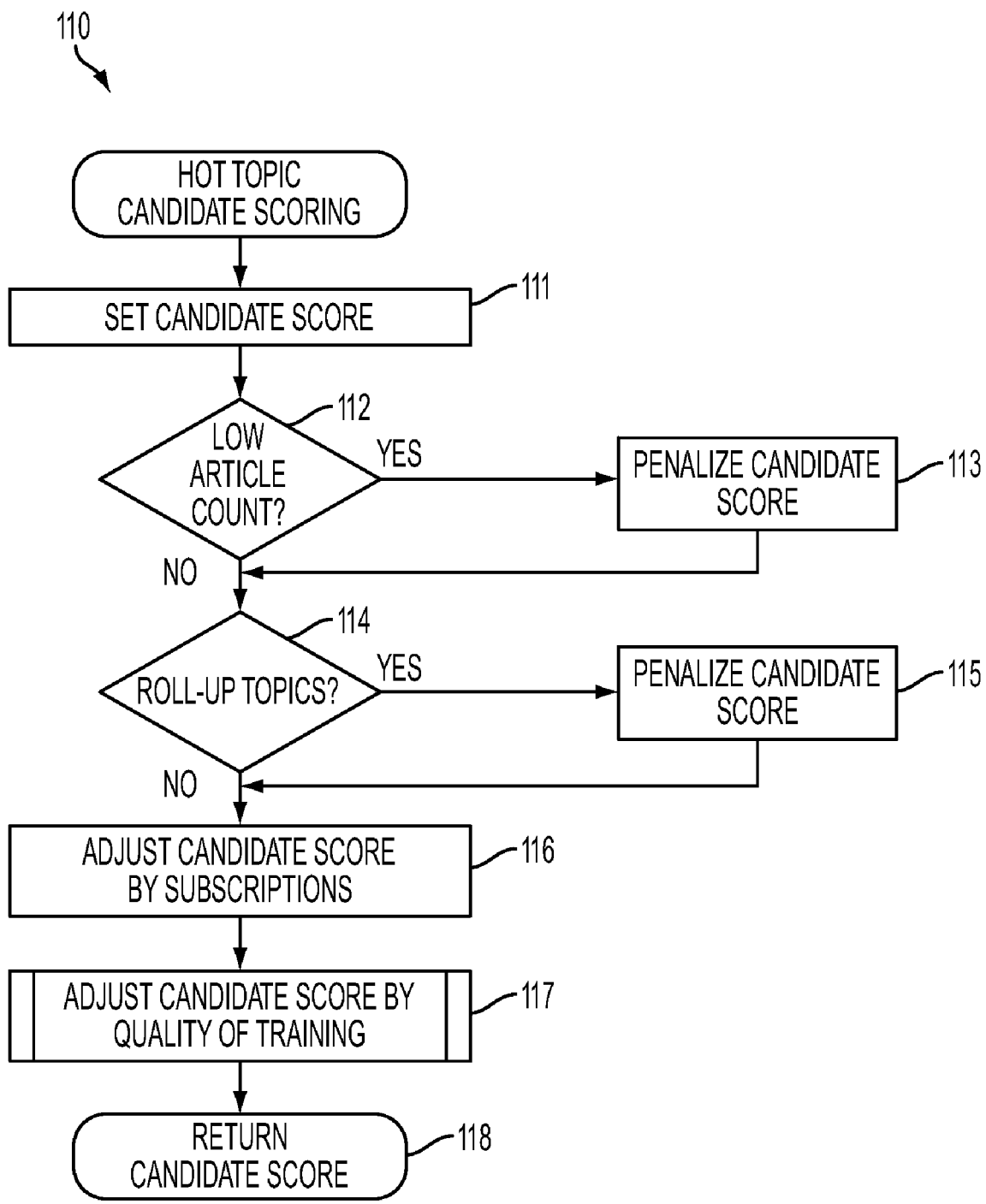
FIG. 8 is a flow diagram showing a routine for scoring hot topic candidates for use with the routine of FIG. 7.

Candidate hot topics are identified by looking for signals of rising interest in a topic. FIG. 8 is a flow diagram showing a routine 110 for scoring hot topic candidates for use with the routine 90 of FIG. 7. The routine removes insufficiently hot topics from further consideration during the current time period.

An initial candidate score is formed based on any increase in article counts (step 111), which can be determined day over week, day over month, and week over month. Each of these periods are respectively weighted by 35, 60, and 60 percent. Variations in the periods and weights are possible. Those candidates that have high article count percentile rises, but low articles counts (step 112) are penalized (step 113). The penalty can be scaled to the maximum number of articles reported. Thus, scoring focuses on the rising curve in the number of articles and large scores will not be awarded to hot topic candidates only due to high article counts. As well, roll-up topics (step 114), that is, topics whose numbers roll up from subtopics, are also penalized (step 115). A bonus is awarded for popular articles, as reflected, for instance, by user subscriptions to the social index (step 116). Finally, a bonus is awarded for candidates on topics that appear to be well-trained (step 117), as further described below with reference to FIG. 10. The hot topic candidate score is then returned (step 118).

Figure 9:
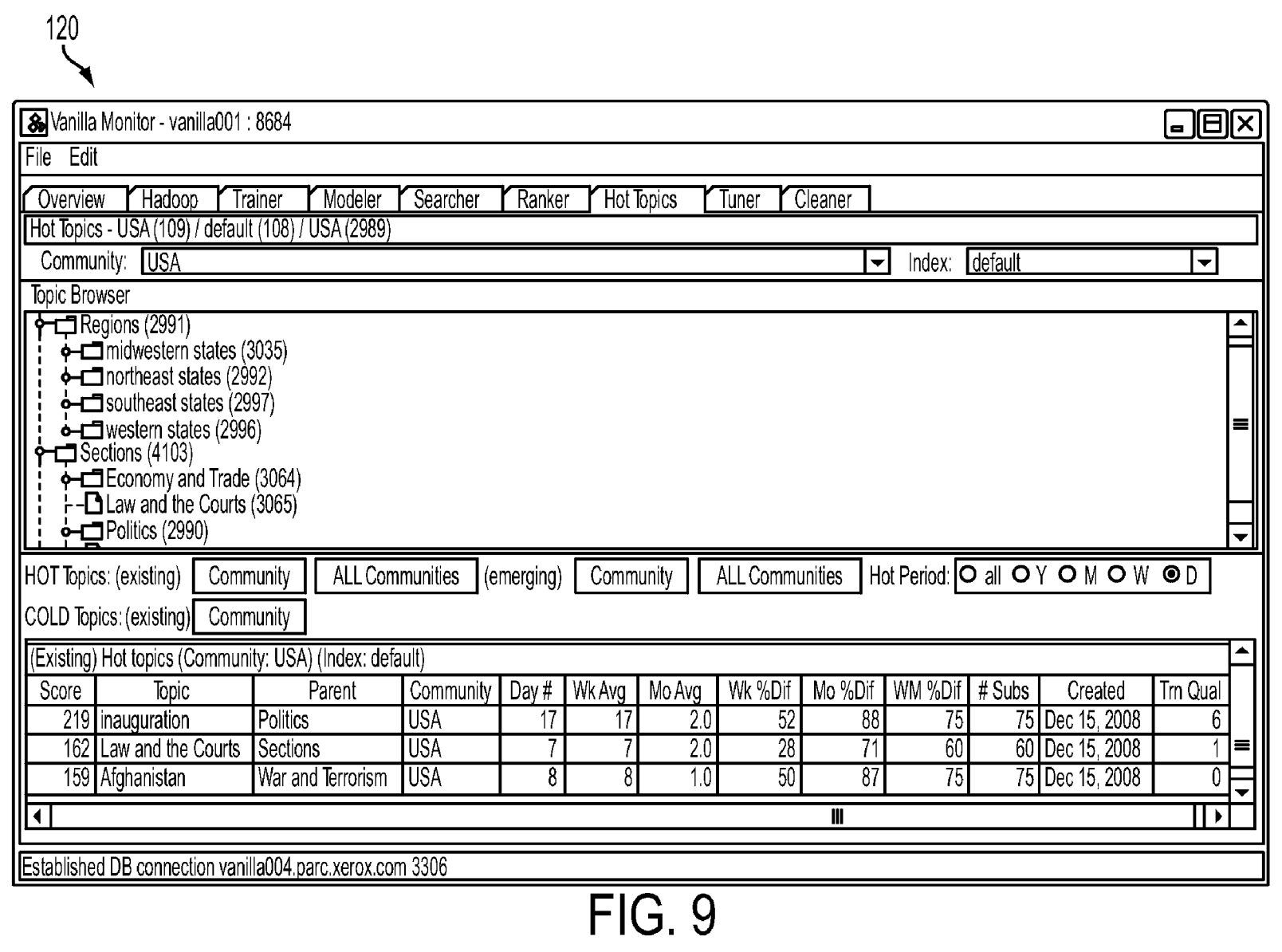

Hot topics are topics on the rise. FIG. 9 is a screen shot diagram 120 showing, by way of example, hot topic candidates. A social index for "USA" is depicted, as observed on Jan. 20, 2009, the date of the presidential inauguration. There were 17 stories pertaining to the inauguration as of the preceding day. The daily average over the last week was eight. The daily average over the last month was two. The increasing article count signals rising interest in the story. The next few columns reflect percentage differences over time periods, including the daily increase over the weekly average, the percentage rise in the daily average day over month, and the percentage rise in the daily rate week over month. The number of subscribers, who are people that have selected this social index on their personal home page, and an estimate of training quality are provided. The training quality estimate is based on the characteristic word scores for the topic and on considerations of the positive and negative training examples used. For example, if the user trained with positive training examples, yet provided no negative training examples, the score would be penalized.

Training Results Scoring

Figure 10:
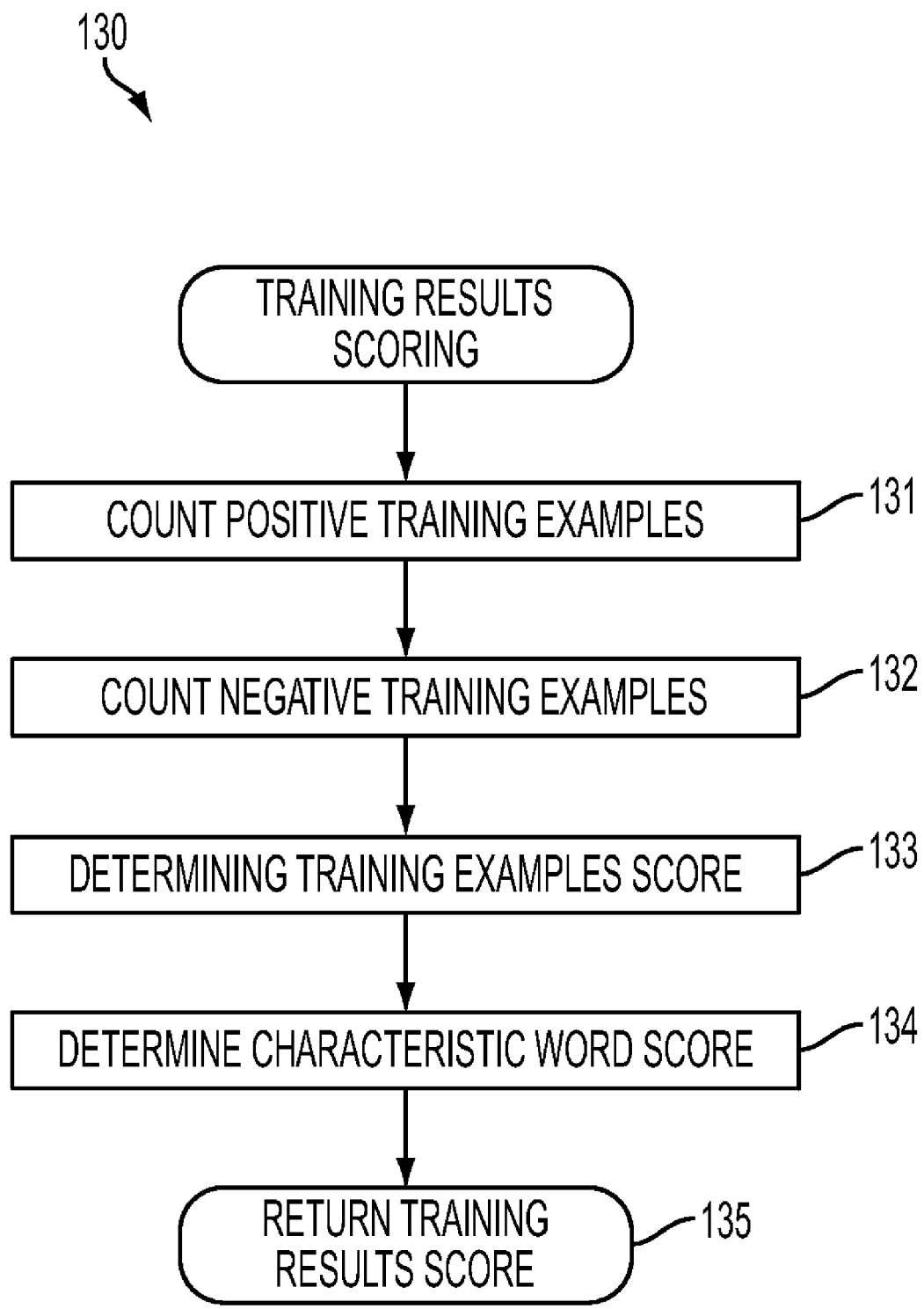
FIG. 10 is a flow diagram showing a routine for scoring training results for use with the routine of FIG. 8.

Topic training is evaluated to avoid identifying as hot poorly trained topics that sweep in lots of articles. FIG. 10 is a flow diagram showing a routine 130 for scoring training results for use with the routine 110 of FIG. 8. A social indexing system that includes example-based training, such as described in commonly-assigned U.S. Patent Application, entitled "System and Method for Performing Discovery of Digital Information in a Subject Area," Ser. No. 12/190,552, filed Aug. 12, 2008, pending, the disclosure of which is incorporated by reference, relies upon a user to interacts with the system to build robust models to classify the articles under the topics in the social index. Where example-based training is used, the number of positive and negative training examples are respectively counted (steps 131 and 132) and scored in proportion to the number of examples used (step 133). If there are no positive training examples, the topic is being default trained, such as described in commonly-assigned U.S. Patent Application, entitled "System and Method for Providing Default Hierarchical Training for Social Indexing," Ser. No. 12/360,825, filed Jan. 27, 2009, pending, the disclosure of which is incorporated by reference, rather than example trained. If the topic is example trained, yet there are no negative training examples, a penalty is applied to the score. Otherwise, more positive examples results in a better score. Typically, between four to six articles are sufficient for good training.

Next, a maximum characteristic word score is determined (step 134). Article scores are normalized to a 100% maximum and are pruned when the scores fall below 30% of the maximum score. In one embodiment, maximum characteristic word scores of 100-700 reflect poorly trained topics while scores of 10K-12K reflect well-trained topics. These scores can be divided over 1,000 to create a ten-point quality scale based on the maximum characteristic word score. Thus, higher characteristic word scores result in stronger training results scores.

In a further embodiment, training results can be scored by evaluating the positive and negative training examples and article lengths, in which training on short articles can be penalized. Finally, the training results score is normalized to not fall below zero and returned (step 135).

Hot topic results can appear across a plurality of indexes. FIG. 11 is a screen shot diagram 150 showing, by way of example, training results. The indexes are again depicted, as observed on Jan. 20, 2009 and the inauguration story dominates. However, hot stories are also present for the secretary of energy and homeland security. Although not reflected in U.S. national press coverage, there were many stories in the world press about a bomb blast in Sri Lanka that occurred on Jan. 19, 2009, as reflected in the story count profile. A third story shows financial news, including Wells Fargo Bank selling $10 B in stock and receiving $25 B from the Treasury Department. As well, Citigroup posted a $8 B loss. These stores reflect the increase in breaking news in the banking sector. A fourth story, about Afghanistan, reflects a number of stories about the expected change in U.S. foreign policy on Afghanistan under President Obama. The next two stories are U.S. news about cabinet appointments.

Filtering Topics

Figure 12:
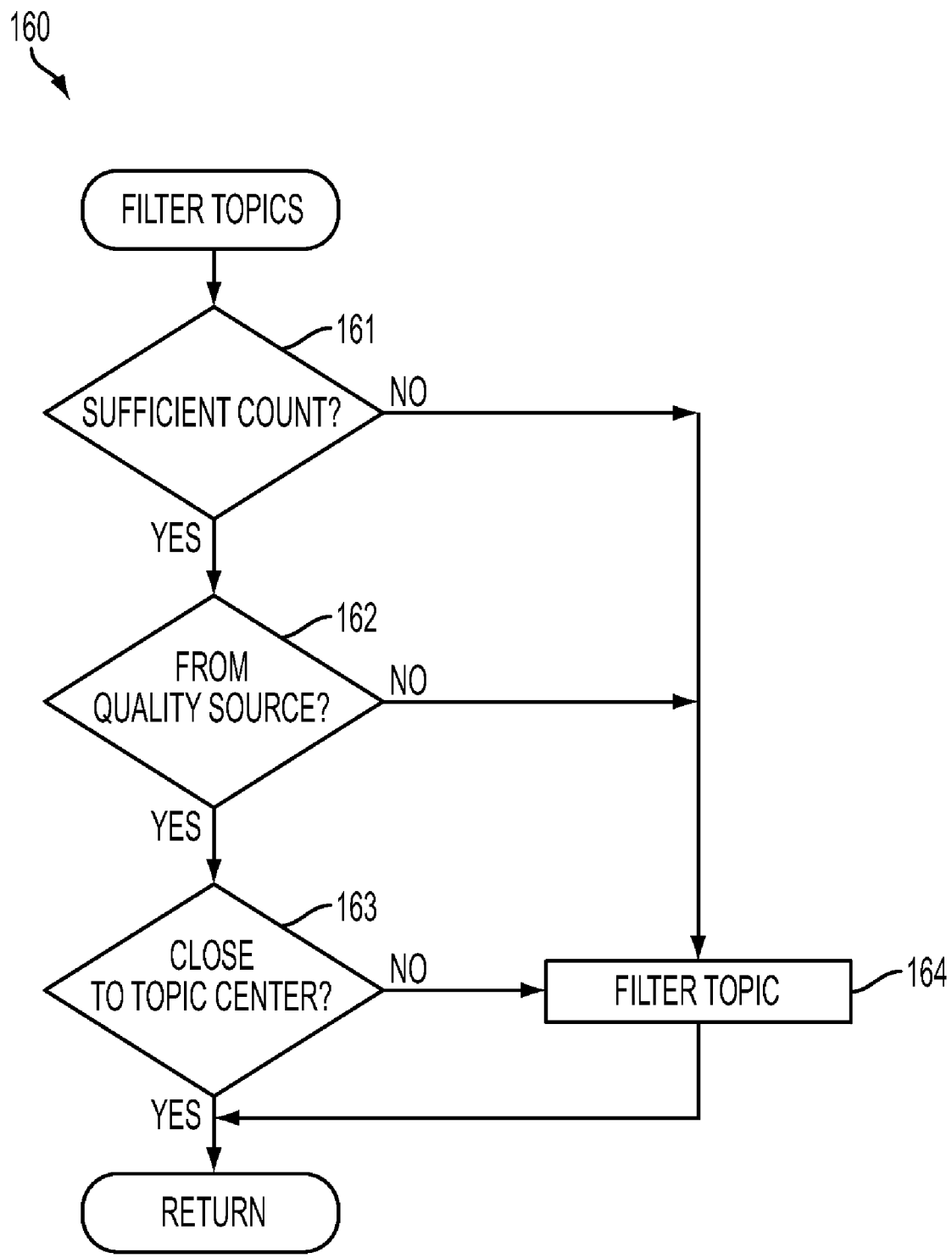
FIG. 12 is a flow diagram showing a routine for filtering topics for use with the method of FIG. 6.

Not all candidate hot topics qualify as representing recent information of use to the user community to whose social index the candidate hot topics belong. FIG. 12 is a flow diagram showing a routine 160 for filtering topics for use with the method 80 of FIG. 6. The routine removes insufficiently hot topics from further consideration during the current time period.

Social indexes categorize articles according to their centrality within a topic. Topics where the count for the current period is not sufficiently greater than the counts of other time periods (step 161) are filtered (step 164). Similarly, topics where the articles counted do not come from quality information sources, which include information sources used by multiple social indexes or information sources that enjoy strong reputations (step 162), are filtered (step 164). Finally, the counting of articles is limited to those articles that are close to the center of a topic (step 163), else the topic is filtered (step 164). Typically, all of the articles under a topic, except those articles the periphery of the topic are included.

Identifying Cold Topics

Figure 13:
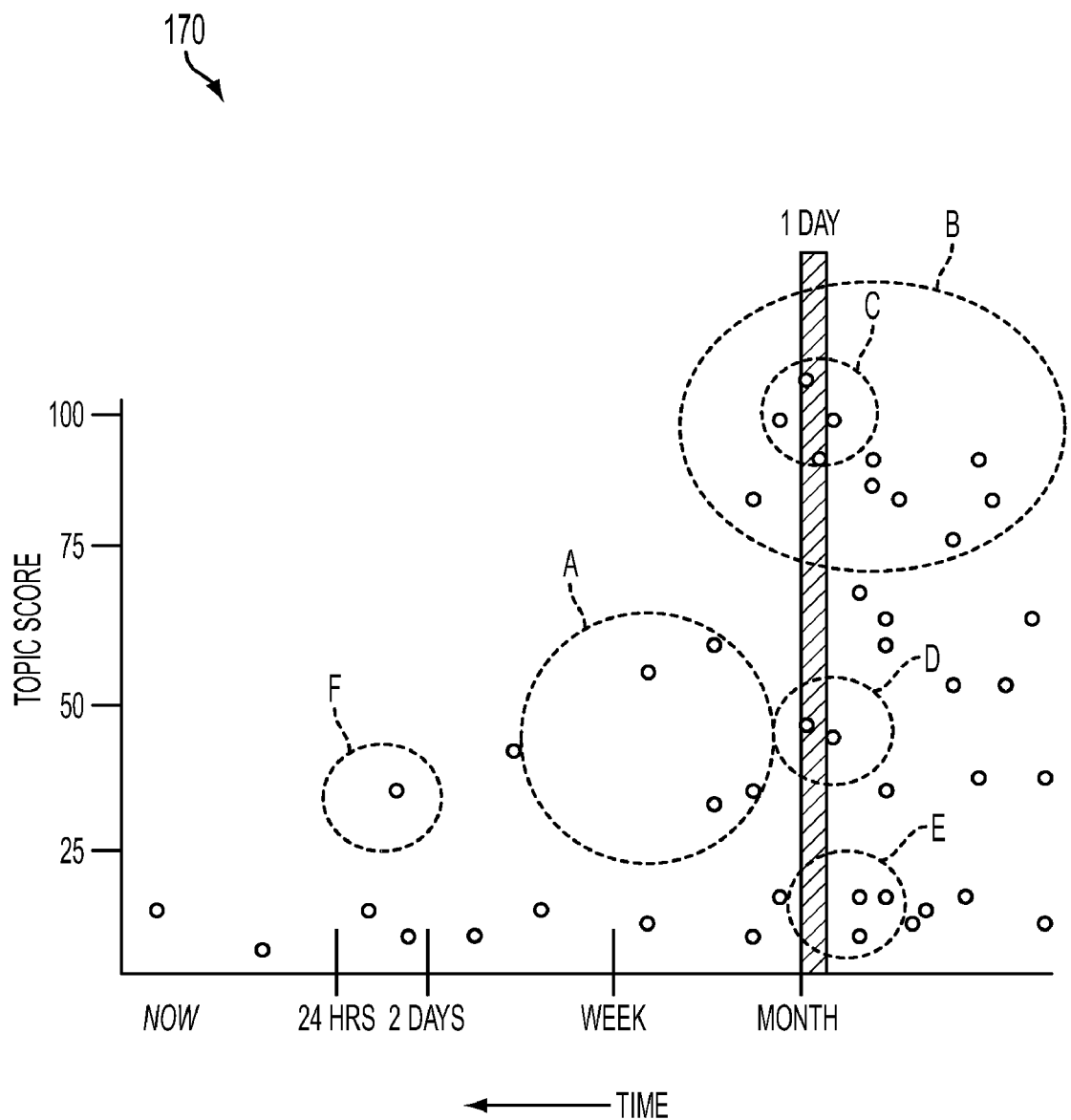
FIG. 13 is a graph showing, by way of example, article count and relevance decay for a cooling topic.

A simple cold topic identifier for a social index finds those indexes that have had no articles over a particular recent period. However, simply looking for an absence of articles is typically not adequate for reliable detection of cold topics. During the life cycle of a topic, the counts and relative relevance of articles under the topic can change. FIG. 13 is a graph 170 showing, by way of example, article count and relevance decay for a cooling topic. The x-axis represents time decreasing away from the present and they-axis represents the topic scores as a measure of relevancy. The time scale is roughly logarithmic. The topic score is a linear metric, which registers one hundred points for articles at the center of a topic and approaches zero for articles at the fringes of the topic. Topic score can be computed using characteristic words, such as described in commonly-assigned U.S. Pat. No. 8,010,545, issued Aug. 30, 2011, the disclosure of which is incorporated by reference. A flurry of published articles appeared about one month prior to the present, when the topic was hot. However, there are fewer articles per unit time approaching the present. A noticeable shift in the topical relevance of the articles has also occurred. The most relevant articles appeared at the peak of numbers of articles and over the next period, the best new articles were of lower topical relevance. There is also a band of low topical relevance articles that makes up a kind of background noise.

The articles are grouped into clusters A, B, C, D, E, and F, which can be used to illustrate the typical goals for a "news reader" and a "relevance reader" on a cooling topic. These goals can be expressed as exemplary usage cases, which include:

Hot topic (as happening a month ago).
   Case 1: News reader. The article groups C, D, and E all include very recent articles on the hot topic. Even if some articles in groups D or E are earlier than the articles in group C, many readers would still prefer to see the articles in group C first. The articles in group E are so low in topic relevance that many readers would prefer not to see them at all.
   Case 2: Relevance reader. These readers want to see the available articles in group C first. If they are revisiting the news frequently to keep up on the hot topic, the readers would prefer to start with the newest articles in group C.
Cold topic (as happening in the present).
   Case 3: News reader. Some readers want to see the latest articles, while other readers prefer not to be distracted since no recent articles on the topic exist.
   Case 4: Relevance reader. Relevance readers want to first see the top articles in group C and would probably want to see the article in group F before comparable articles in groups A or D.
Recurring topic.
   Case 5: News reader. These readers want to see the articles on the latest cycle first and probably have little interest in older cycles.
   Case 6: Relevance reader. These readers are focused on the most topical articles. They prefer these articles to be organized coherently by cycle because recurrence patterns may reflect topical variations.
Two-day review (starting now).
   Case 7: News reader. There is a recent article in group F. Articles in groups A, B, C, D, and E are too old and should not be shown. Most readers have low interests in the lowest scoring articles.
   Case 8: Relevance reader. As these readers also want a two-day review, only the article in group F is of interest. The readers' goals are similar to those of a news reader goal in that articles are sorted temporally and limited over two days.

Some observations can be made from the cases:

The reader goals are typically mixed, rather than pure. Considerations of time enter, even when relevance is the main focus and considerations of relevance arise, even when news is the main focus.

When time is a critical preference, even small differences in time matter in ordering the articles. For example, when a reader is following breaking news, differences of a few hours or even minutes matter affect the reader's information goals and should be reflected in the order of presentation.

Relevance comparisons are more qualitative than quantitative. Large differences in relevance are important, but small differences are not. Articles that are significantly more topically-relevant should appear first.

There is little or no interest in articles of low relevance. Specifically, there is typically a decrease not only in the number of articles appearing on the topic, but also in the relevance of the articles. As a topic decays, the articles appearing tend to be on the edges of the topic, rather than the core.

Figure 14:
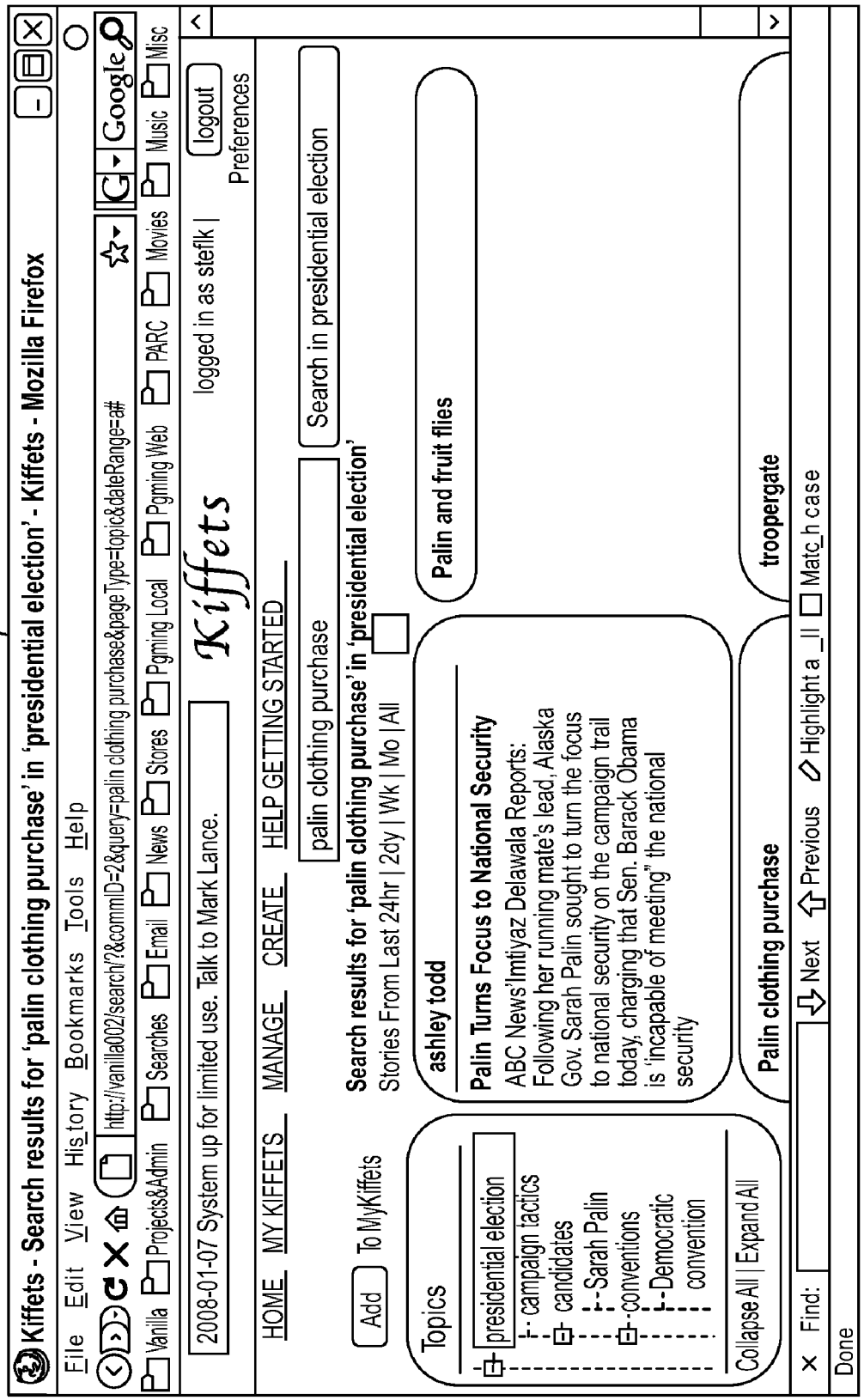
FIG. 14 is a screen shot diagram showing, by way of example, search results supporting the need for cold topic identification.

In the life-cycle of topics, topic boundaries are generally defined during example-based training by using the first articles that appear. Throughout each day of training, additional articles arrive and the topic boundaries are sometimes adjusted. However, as interest in the topic fades, the number of articles on the topic goes down and any articles that do appear tend to be on the periphery, rather than the center, of the topic. FIG. 14 is a screen shot diagram 180 showing, by way of example, search results 181 supporting the need for cold topic identification. The topics depicted were selected in response to a search query performed several months following the presidential election with the search terms "palin clothing purchase" in a social index on the "Presidential Election." The topics in the topic tree reflect little continuing interest to a reader browsing through the topics of this index. By removing these topics from the topic tree, the user can focus more on topics of recent interest. Similarly, no articles appeared under "Palin and Fruit Flies," which ought therefore be deleted as a topic.

Figure 15:
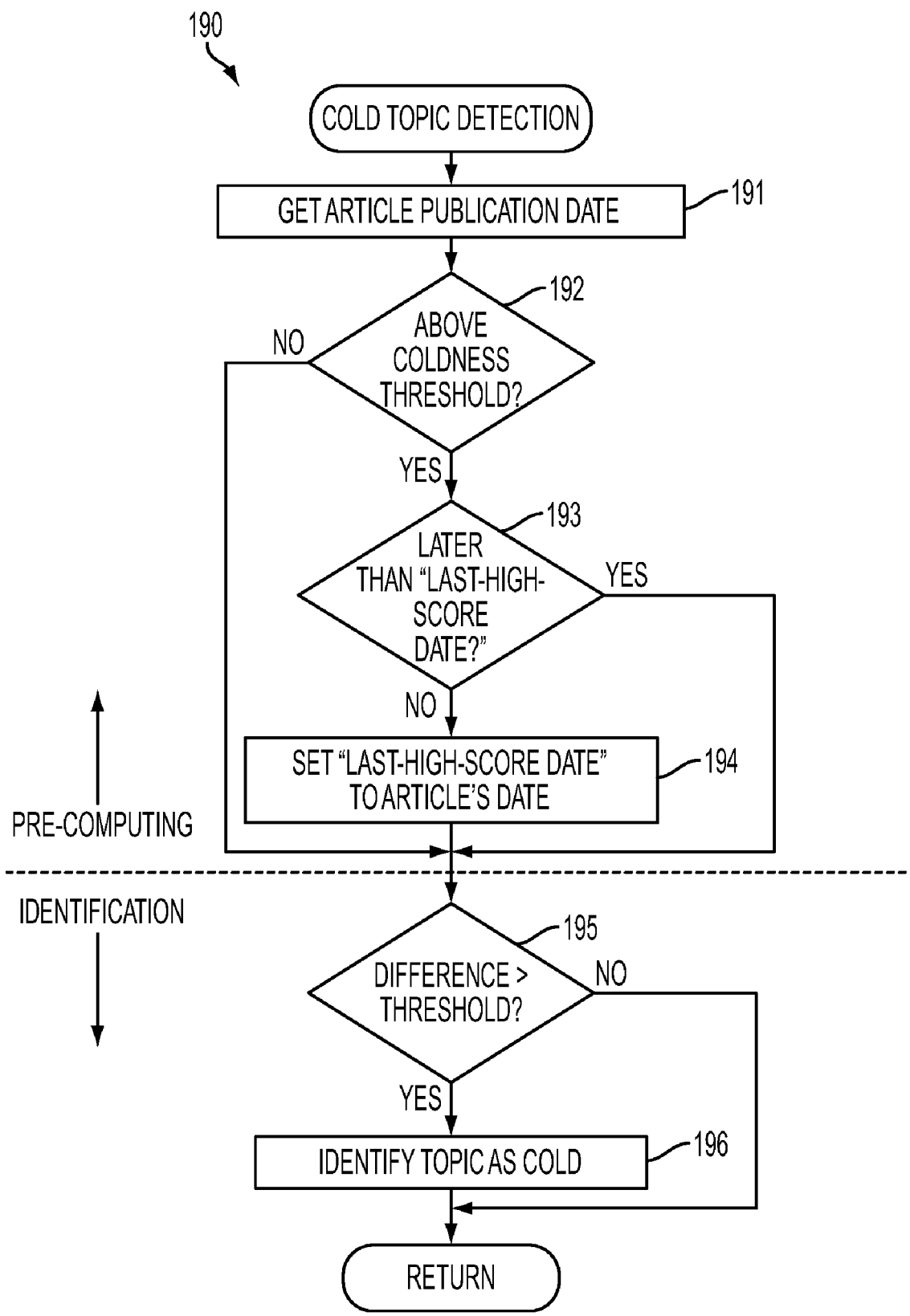
FIG. 15 is a flow diagram showing a routine for detecting cold topics in accordance with a further embodiment.

Cold topic detection involves two parts: a pre-computation part and an identification part. The pre-computation part of cold-topic detection can be carried out effectively during article classification. FIG. 15 is a flow diagram showing a routine 190 for detecting cold topics in accordance with a further embodiment. Articles are classified in a social indexing system under three circumstances: (1) after the system collects new articles for a source; (2) when a topic is trained, so that articles in the archive need to be re-considered according to new criteria; and (3) when a source with previously-collected articles is added to an index. Classification includes matching articles against a fine-grained topic model and scoring the articles against a coarse-grained topic model. The database for articles includes a publication date, or other indication of recency (step 191). When an article is classified under a topic, the social indexing system checks whether the score for the article is above a coldness threshold (step 192), such as 50 out of a 100. If the article is above the threshold, the system compares the article's publication date, or other indication of recency, to a "last-high-score date" associated with the topic. If the article's date is later than the last-high-score date (step 193), the last-high-score date is set to the article's date. In this way, the last-high-score date is maintained as the date of the last high-scoring article for the topic. This computation of the last-high-score date (steps 191-194) is the pre-computed part of cold topic detection.

The cold topic identification part can be carried out just prior to any display of topical information. Given that the last-high-score dates are maintained, a cold topic is any topic (step 196) where the difference between the current time and the topic's last-high-score date is greater than some threshold (step 195), such as a month. This computation (steps 195-196) is the identification part of cold topic detection. In a further embodiment, popularity metrics, such as how often people read articles in the topic or search for the topic, could also be used to influence the measure of when a topic is identified as "cold."

Managing User Attention

Hot and cold topic detection enables a social indexing system to better focus the presentation of information in ways that effectively satisfy user information needs. Social indexing systems often have controls that indicate a presentational focus on either recent events or events over long periods of time, such as described in commonly-assigned U.S. Patent Application, entitled "System and Method for Using Banded Topic Relevance and Time for Article Prioritization," Ser. No. 12/360,823, filed Jan. 27, 2009, pending, the disclosure of which is incorporated by reference. By providing a user with a enhanced display of hot topics, the system helps a user to discover the most recent changes through hot topic detection. The social indexing system can take note of the user's focus and act to enhance the display of information within that focus.

Similarly, a user's experience in using a social indexing system is further focused through cold topic detection by removing from view information, which has become increasingly out-of-date. In conventional Web information retrieval systems, old articles are typically not shown. A cold topic detector, however, does more than merely skipping old articles. Rather, a cold topic detector makes possible not only eliding out-of-date articles, but also eliding the topics themselves from navigational guides, such as indexes and topic trees, for topics that have become cold.

Finally, information, which includes both articles and topics, from hot and cold topic detectors can be used selectively. For example, indicating "no results found" when search results correspond to topics that have gone cold would be confusing to a user. To avoid confusion, search results can instead include both navigational guides and articles that selectively include cold topics in response to a user's query. Thus, the selected cold topics would be displayed if a topic happened to be older than the user's current temporal focus, but was clearly the most relevant material for their attention.

While the invention has been particularly shown and described as referenced to the embodiments thereof, those skilled in the art will understand that the foregoing and other changes in form and detail may be made therein without departing from the spirit and scope.

What is claimed is:

1. A computer-implemented method for managing user attention by detecting hot topics in social indexes, comprising the steps of:

maintaining articles of digital information and at least one social index comprising topics that each relate to one or more of the articles;

retrieving topic models matched to the digital information for each topic, comprising:

determining a form of training used to form the topic models;

generating a training score under example-based training for each topic chosen, comprising:
counting numbers of positive and negative training examples;
setting a training score in proportion to the positive and negative training examples numbers used;
identifying a number of characteristic words comprised in the articles relating to the topic; and
adjusting the training score in proportion to the number of the characteristic words; and
favoring those topics with the higher training scores, wherein the topic models comprise at least one of fine-grained topic models and coarse-grained topic models;
classifying the articles under the topics using the topic models;
evaluating each of the topics in the social index for hotness, comprising:
defining a plurality of time periods projected from the present;
evaluating counts of the articles appearing under each time period;
choosing the topics exhibiting a rising curve in the count of the articles that increases with recency during the time periods; and
analyzing quality of the articles within the topics chosen; and
presenting the topics comprised of the articles having acceptable quality,
wherein the steps are performed on a suitably-programmed computer.

2. A method according to claim 1, wherein the time periods comprise, in order of decreasing weight, one or more of day over week, day over month, and week over month.

3. A method according to claim 1, further comprising the steps of:
for each of the topics chosen, determining closeness of the topic to a center of the topic; and
favoring those topics comprised of the articles close to the center of the topic.

4. A method according to claim 1, further comprising:
determining user metrics for the articles counted, comprising the steps of:
counting a number of times that each article appearing under each time period has been read; and
finding a number of votes on each article appearing under each time period has been read; and
favoring those topics comprised of the articles with the stronger user metrics.

5. A method according to claim 1, further comprising the steps of:
setting a candidate score for each of the topics based on an increase in the count of the articles under each time period;
discounting each candidate score for those topics comprised of a high article count percentile rise and low article count;
discounting each candidate score for those topics comprised of a roll-up topic;
enhancing each candidate score comprised of popular articles; and favoring those topics with the higher candidate scores.

6. A method according to claim 1, wherein the quality of the articles comprises one or more of recent growth during the time periods; source reputation, and increase in number of sources.

7. A computer-implemented method for managing user attention by detecting cold topics in social indexes, comprising the steps of:
maintaining articles of digital information and at least one social index comprising topics that each relate to one or more of the articles, wherein each article includes each of content and an indication of recency;
retrieving topic models matched to the digital information for each topic, comprising:
determining a form of training used to form the topic models;
generating a training score under example-based training for each topic chosen, comprising:
counting numbers of positive and negative training examples;
setting a training score in proportion to the positive and negative training examples numbers used;
identifying a number of characteristic words comprised in the articles relating to the topic; and
adjusting the training score in proportion to the number of the characteristic words; and
favoring those topics with the higher training scores, wherein the topic models comprise at least one of fine-grained topic models and coarse-grained topic models;
classifying the articles under the topics using the topic models;
evaluating each of the topics in the social index for coldness, comprising:
maintaining a coldness threshold time period; and
eliding those articles comprised of the indication of recency that exceeds the coldness threshold time period; and
presenting the topics that were not elided,
wherein the steps are performed on a suitably-programmed computer.

8. A computer-implemented system for managing user attention by detecting hot topics in social indexes, comprising:
an electronic database, comprising:
articles of digital information and at least one social index comprising topics that each relate to one or more of the articles maintained for social indexing; and
topic models matched to the digital information for each topic;
a computer coupled with the electronic database and comprising a processor and memory within which code for execution by the processor is stored, further comprising:
a training evaluation module configured to determine a form of training used to form the topic models;
a training scoring module configured to generate a training score under example-based training for each topic chosen, comprising:
a counting module configured to count numbers of positive and negative training examples, to set a training score in proportion to the positive and negative training examples numbers used;
a characteristic word module configured to identify a number of characteristic words comprised in the articles relating to the topic; and
an adjustment module configured to adjust the training score in proportion to the number of the characteristic words, wherein those topics with the higher training scores are favored and the topic models comprise at least one of fine-grained topic models and coarse-grained topic models;
a classifier module configured to classify the articles under the topics using the topic models;
an evaluation module configured to evaluate each of the topics in the social index for hotness, comprising:
a plurality of electronically-stored time periods projected from the present;
an article count evaluation module configured to evaluate counts of the articles appearing under each time period;
a topic chooser module configured to choose the topics exhibiting a rising curve in the count of the articles that increases with recency during the time periods; and
an analysis module configured to analyze quality of the articles within the topics chosen; and
a user interface configured to visually present the topics comprised of the articles having acceptable quality.

9. A system according to claim 8, wherein the time periods comprise, in order of decreasing weight, one or more of day over week, day over month, and week over month.

10. A system according to claim 8, wherein the processor and memory further comprise:
an topic evaluation module configured to determine, for each of the topics chosen, closeness of the topic to a center of the topic, and to favor those topics comprised of the articles close to the center of the topic.

11. A system according to claim 8, wherein the processor and memory further comprise:
a user metrics evaluation module configured to determine user metrics for the articles counted, comprising
a read count module configured to count a number of times that each article appearing under each time period has been read; and
a vote count module configured to find a number of votes on each article appearing under each time period has been read,
wherein those topics comprised of the articles with the stronger user metrics are favored.

12. A system according to claim 8, wherein the processor and memory further comprise:
a candidate scoring module configured to set a candidate score for each of the topics based on an increase in the count of the articles under each time period, to discount each candidate score for those topics comprised of a high article count percentile rise and low article count, to discount each candidate score for those topics comprised of a roll-up topic, to enhance each candidate score comprised of popular articles, and to favor those topics with the higher candidate scores.

13. A system according to claim 8, wherein the quality of the articles comprises one or more of recent growth during the time periods; source reputation, and increase in number of sources.

14. A computer-implemented system for managing user attention by detecting cold topics in social indexes, comprising:
an electronic database, comprising:
articles of digital information and at least one social index comprising topics that each relate to one or more of the articles maintained for social indexing, wherein each article includes each of content and an indication of recency; and
topic models matched to the digital information for each topic;
a computer coupled with the electronic database and comprising a processor and memory within which code for execution by the processor is stored, further comprising:
a training determination module configured to determine a form of training used to form the topic models;
a training scoring module configured to generate a training score under example-based training for each topic chosen, comprising:
a counting module configured to count numbers of positive and negative training examples, to set a training score in proportion to the positive and negative training examples numbers used;
a characteristic word module configured to identify a number of characteristic words comprised in the articles relating to the topic; and
an adjustment module configured to adjust the training score in proportion to the number of the characteristic words,
wherein those topics with the higher training scores are favored and the topic models comprise at least one of fine-grained topic models and coarse-grained topic models;
a classifier module configured to classify the articles under the topics using the topic models;
an evaluation module configured to evaluate each of the topics in the social index for coldness, comprising:
an electronically-stored coldness threshold time period; and
an elision module configured to elide those articles comprised of the indication of recency that exceeds the coldness threshold time period; and
a user interface configured to visually present the topics that were not elided

* * * * *